United States Patent
Onofrio

(10) Patent No.: US 12,029,149 B2
(45) Date of Patent: Jul. 9, 2024

(54) PLANT FEEDING DEVICE FOR USE WITH DRIP IRRIGATION

(71) Applicant: The Toro Company, Bloomington, MN (US)

(72) Inventor: Travis Onofrio, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 240 days.

(21) Appl. No.: 17/659,988

(22) Filed: Apr. 20, 2022

(65) Prior Publication Data

US 2022/0338408 A1    Oct. 27, 2022

Related U.S. Application Data

(60) Provisional application No. 63/178,425, filed on Apr. 22, 2021.

(51) Int. Cl.
*A01C 23/04*    (2006.01)
*F16K 3/08*    (2006.01)

(52) U.S. Cl.
CPC .............. *A01C 23/042* (2013.01); *F16K 3/08* (2013.01); *Y10T 137/4891* (2015.04)

(58) Field of Classification Search
CPC .............. F16K 3/08; Y10T 137/86718; Y10T 137/86743; Y10T 137/4891; A01C 23/042
See application file for complete search history.

(56) References Cited

U.S. PATENT DOCUMENTS

| | | | | |
|---|---|---|---|---|
| 2,798,767 A * | 7/1957 | Andrews | ............... | B01F 25/316 137/550 |
| 3,439,698 A * | 4/1969 | Mansell | .................... | B60S 3/04 137/268 |
| 3,770,205 A * | 11/1973 | Proctor | ................. | B01F 25/316 239/317 |
| 6,012,650 A * | 1/2000 | Hadar | .................. | A01C 23/042 222/630 |
| 6,736,337 B2 * | 5/2004 | Vildibill | ............... | A01G 25/023 239/533.13 |
| 7,487,790 B2 * | 2/2009 | King | ..................... | E04H 4/1281 137/268 |
| 7,604,018 B2 * | 10/2009 | King | ..................... | B01F 25/316 422/282 |
| 7,661,607 B1 * | 2/2010 | Bowden | .................. | E03C 1/046 239/581.1 |
| 8,210,451 B1 * | 7/2012 | Gooch | ................. | A01C 23/042 137/268 |
| 2016/0129404 A1 * | 5/2016 | Pasquier | ................ | E03C 1/046 137/268 |

\* cited by examiner

*Primary Examiner* — Jessica Cahill
(74) *Attorney, Agent, or Firm* — Inskeep IP Group, Inc.

(57) ABSTRACT

A fertilizer device is described in one example, that is configured to connect to an irrigation system and direct water past fertilizer. The fertilizer device may include a cap rotatably disposed on a base portion. Depending on the rotational position of the cap relatively to the base portion, different amounts of water are directed against or past the fertilizer within a chamber of the device. The device also may include a water path around the fertilizer such that, even if water flow to the fertilizer is cut off, water without fertilizer will still pass through and out of the device.

18 Claims, 8 Drawing Sheets

PLANT FEEDING DEVICE FOR USE WITH DRIP IRRIGATION

RELATED APPLICATIONS

This application claims benefit of and priority to U.S. Provisional Application Ser. No. 63/178,425 filed Apr. 22, 2021, entitled Plant Feeding Device For Use With Drip Irrigation, which is hereby incorporated herein by reference in its entirety.

BACKGROUND OF THE INVENTION

Plant fertilizers provide plants with added nutrients, such as nitrogen, phosphate, potash, and chlorine, to help promote healthy growth. In recent years, slow-release fertilizers have become a popular method of fertilizing plants with a minimal amount of effort. These slow-release fertilizers often come in the form of smaller pellets or larger tablets, which are designed to be placed in the soil near a plant where they slowly dissolve over the course of several years, releasing their nutrients which are ultimately absorbed by one or more of the nearby plants.

Slow-release fertilizers typically rely on contact with water to dissolve over their several year lifespans. In climates that receive frequent rain or that have above-ground irrigation that completely saturates the soil, these slow-release fertilizers release their nutrients relatively well. However, in dryer climates and those with drip irrigation lines, less water is used for irrigation and therefore slow-release fertilizers may not dissolve and distribute nutrients as intended. For example, drip irrigation lines may be located above or below ground and typically release small drips of water adjacent a plant. However, if the slow-release tablet or pellets are not positioned within the drip area that becomes wet, it will remain dry and will not release its nutrients to the plant.

Therefore, there is a need for an improved method of distributing slow-release fertilizers, particularly in dryer climates that utilize drip irrigation.

SUMMARY OF THE INVENTION

The present invention is generally directed to a fertilizer device having a housing forming an inner chamber with a fertilizer holding area configured for holding fertilizer. The chamber has a first water flow path through the fertilizer holding area and a second water flow path around the fertilizer holding area. An adjustment mechanism allows the first water flow path to be completely closed (e.g., a first position) or partially/completely opened (e.g., a second position). The second water flow path allows water to continue to flow through the device, even if the first water flow path is completely closed. Hence, irrigation may be performed without regard to the amount of fertilizer being delivered with the device.

In one embodiment, the housing comprises at least a lower body portion having one or more outer walls forming an inner chamber, and one or more inner walls spaced apart from the outer walls and forming an inner fertilizer holding area within the inner chamber. The one or more outer walls may form a water inlet and a water outlet which allows the water to enter and exit the device respectively. The one or more inner walls form a first opening and a second opening to the fertilizer holding area which allows the water to enter and exit this area, depending on settings of the adjustment mechanism. The one or more outer walls and the one or more inner walls form a second water flow path around the inner fertilizer holding area, while the first water flow path extends through the first and second opening of the one or more inner walls.

In one embodiment, the housing of the device may include a lower body portion and a cap sized and shaped to engage and rotatably move on a top of the lower body portion.

In one embodiment, the adjustment mechanism includes at least one fertilizer adjustment wall or member having a first position blocking the first opening of the one or more inner walls, and at least a second position leaving open the first opening of the one or more inner walls. The at least one fertilizer adjustment wall may be directly connected to the cap engaged or connected and controlled by another mechanism.

In one embodiment, the fertilizer device is configured to connect to a drip irrigation system. The fertilizer device may be in communication with a drip emitter or may include a drip emitter within its interior (e.g., inlet or chamber).

In another embodiment, the fertilizer device includes a removable basket that is sized and shaped to fit within the fertilizer holding area.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
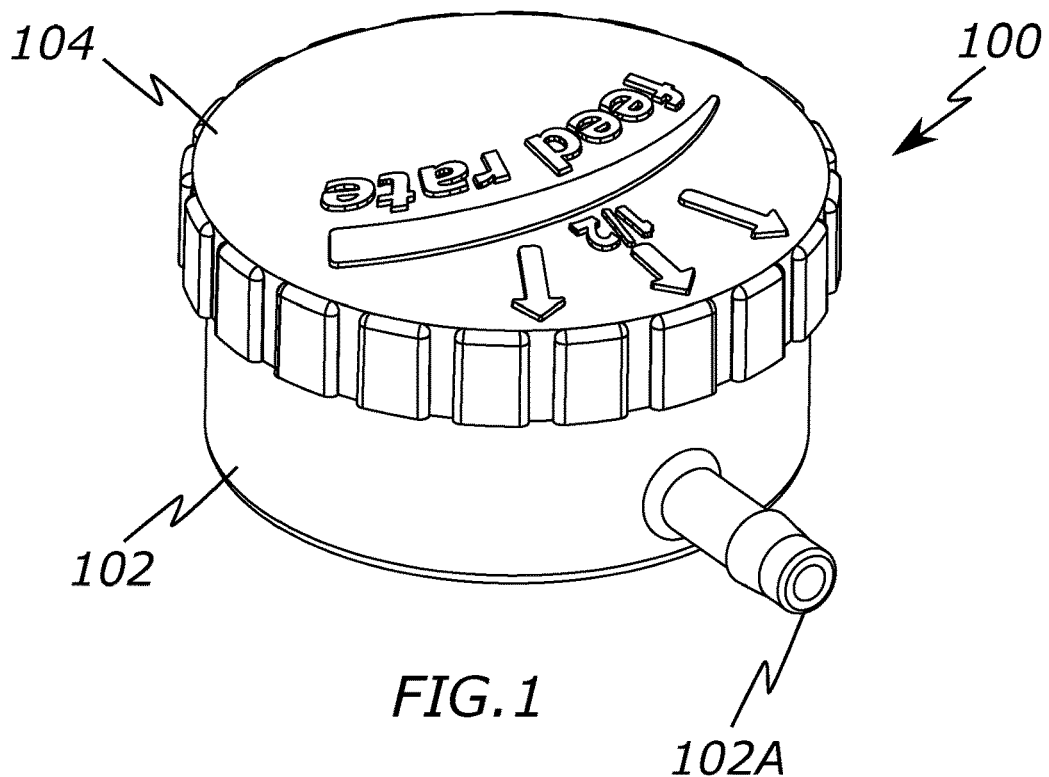
FIG. 1 is a side perspective view of a plant fertilizer device.
Figure 2:
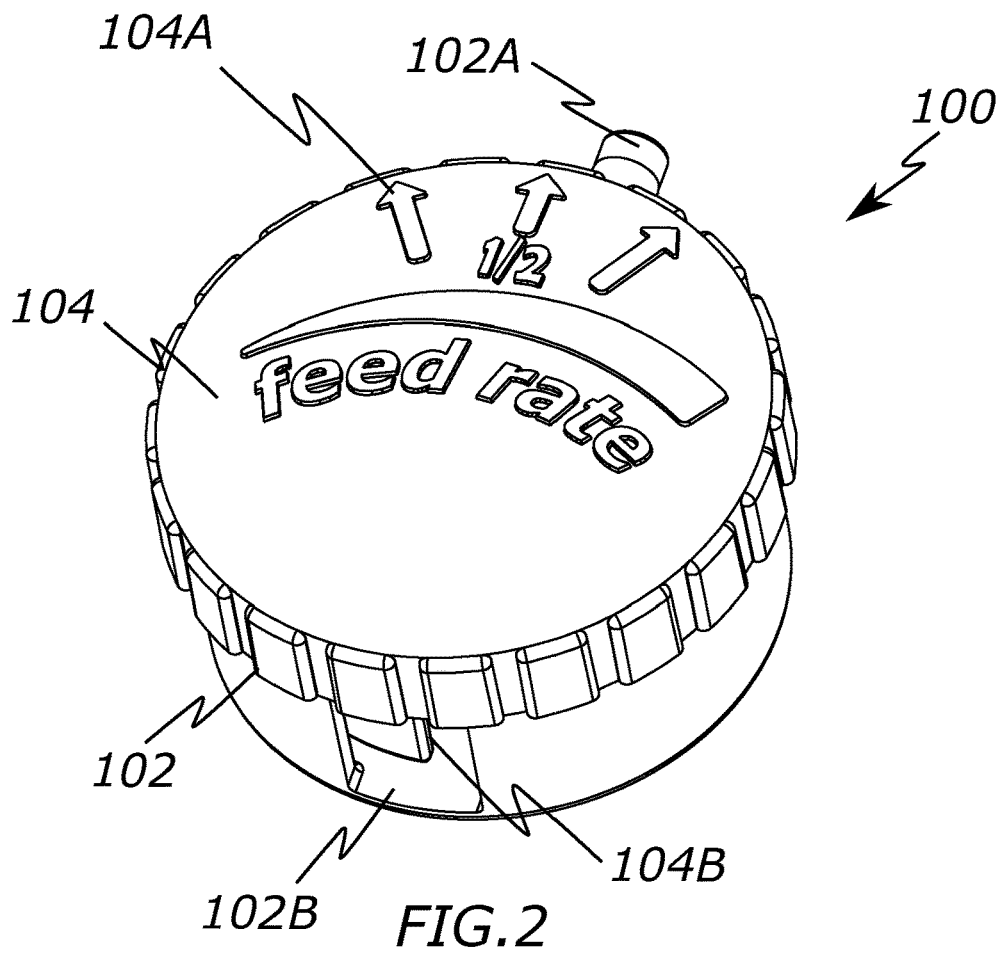
FIG. 2 is a top perspective view of the plant fertilizer device of FIG. 1.
Figure 3:
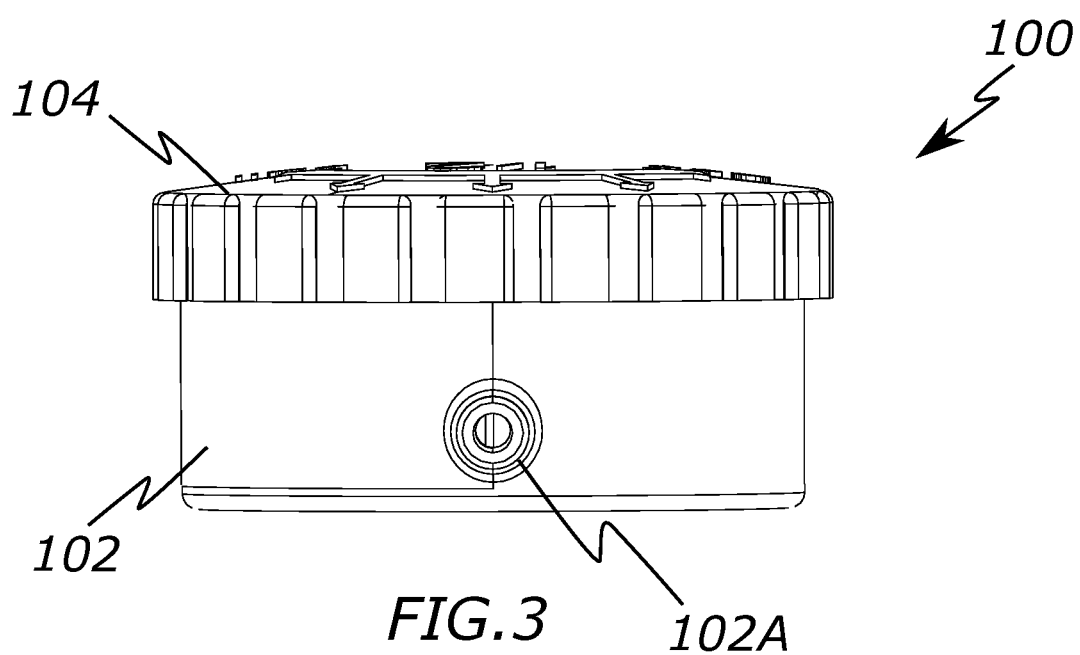
FIG. 3 is a side view of the plant fertilizer device of FIG. 1.
Figure 4:
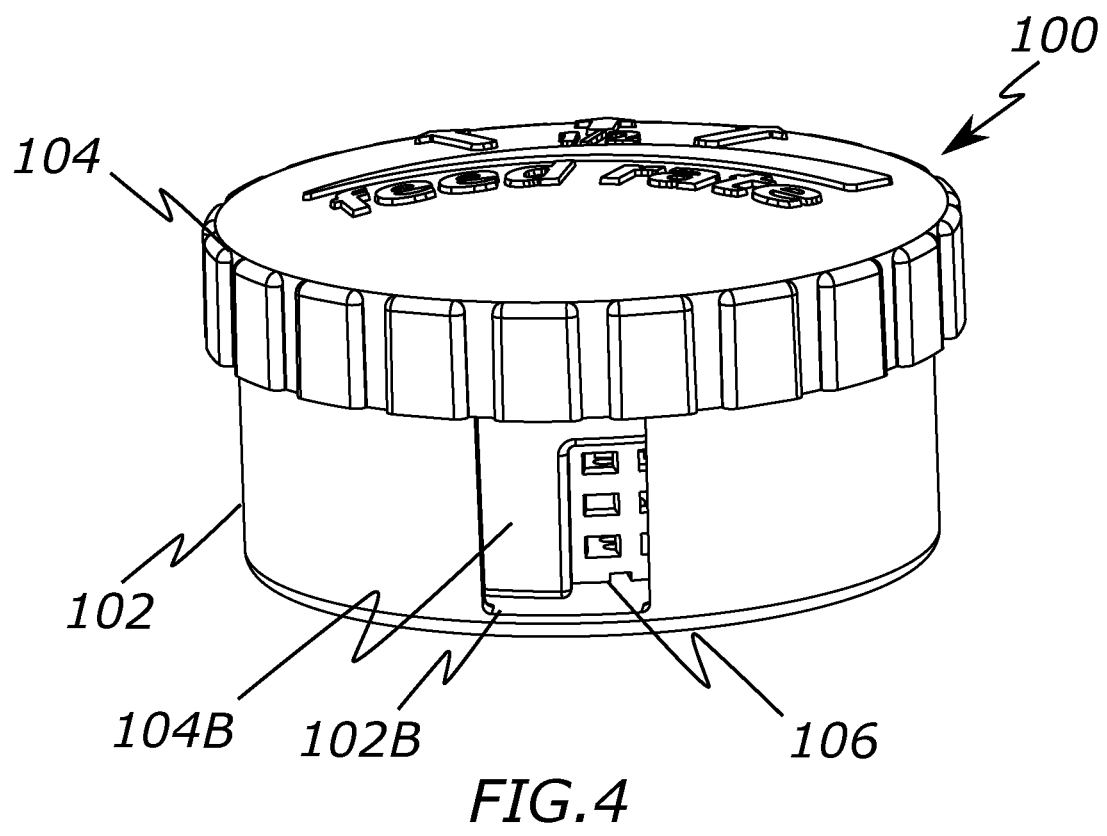
FIG. 4 is a side perspective view of the plant fertilizer device of FIG. 1.
Figure 5:
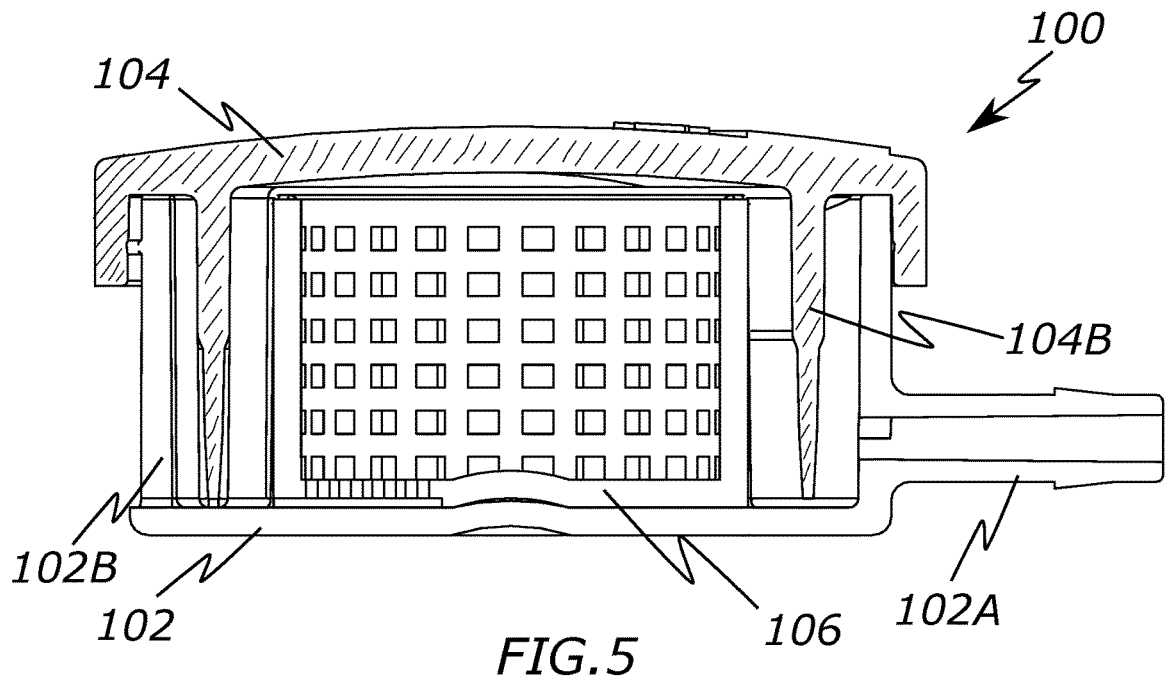
FIG. 5 is a cross sectional view of the plant fertilizer device of FIG. 1.
Figure 6:
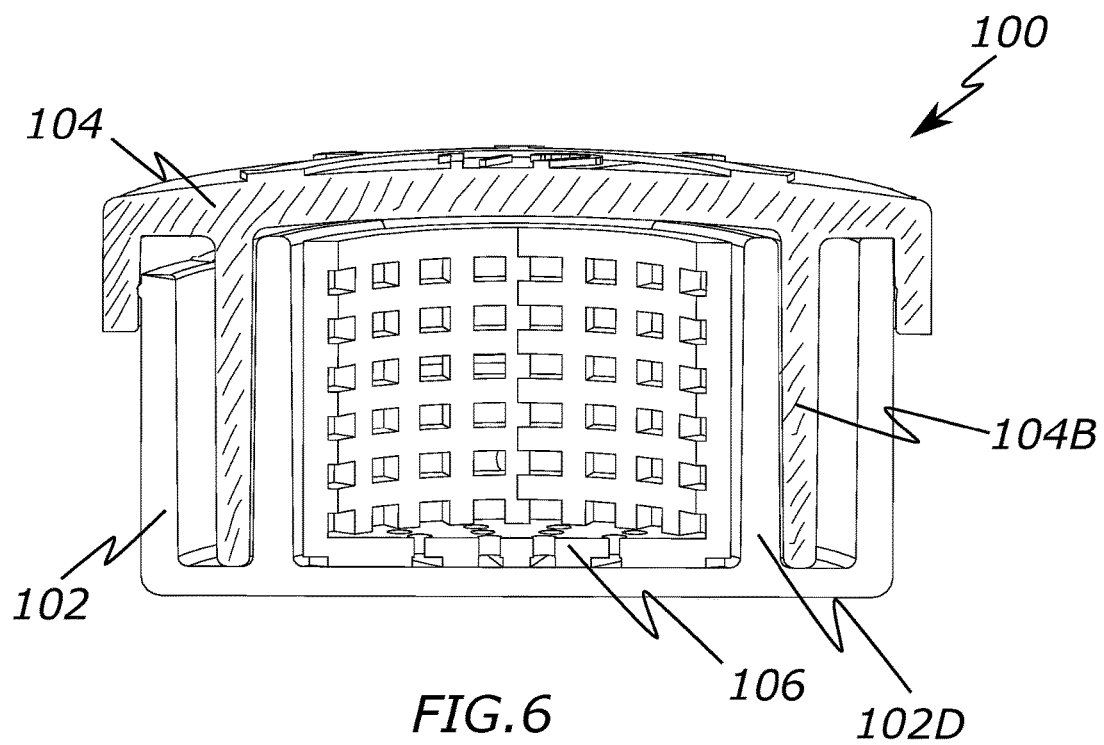
FIG. 6 is a cross sectional view of the plant fertilizer device of FIG. 1.
Figure 7:
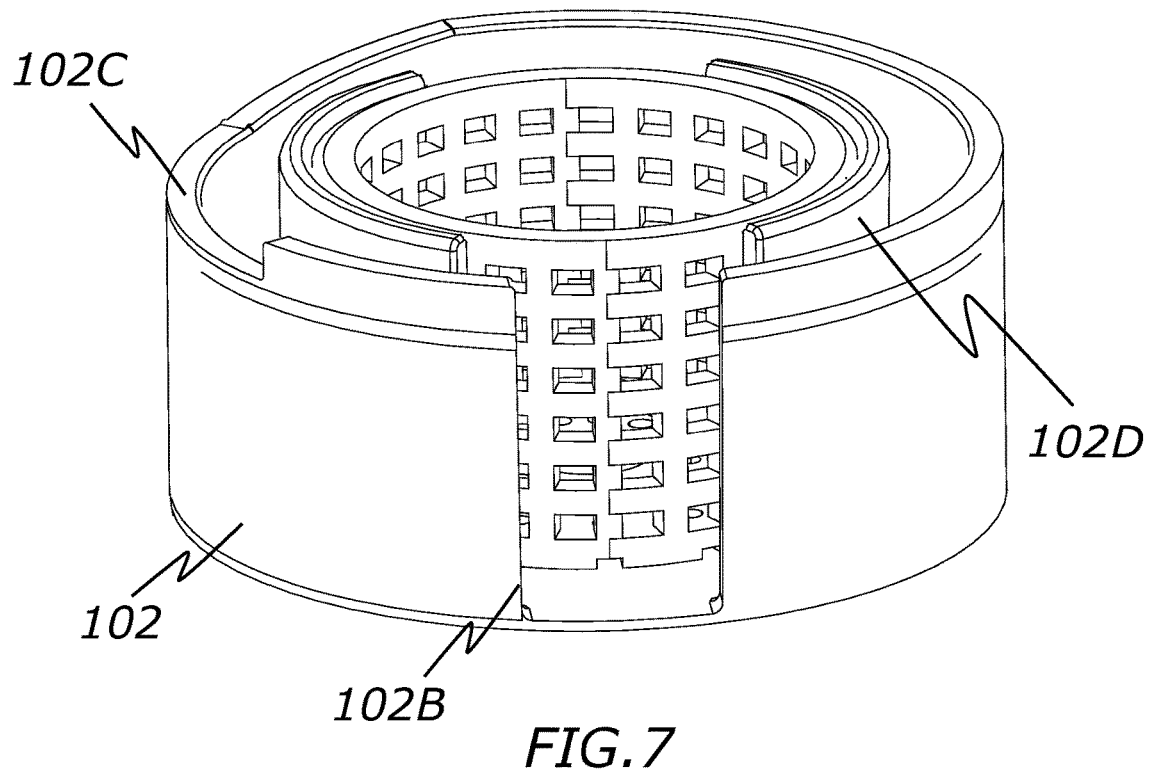
FIG. 7 is a side perspective view of view of the plant fertilizer device of FIG. 1 without a cap.
Figure 8:
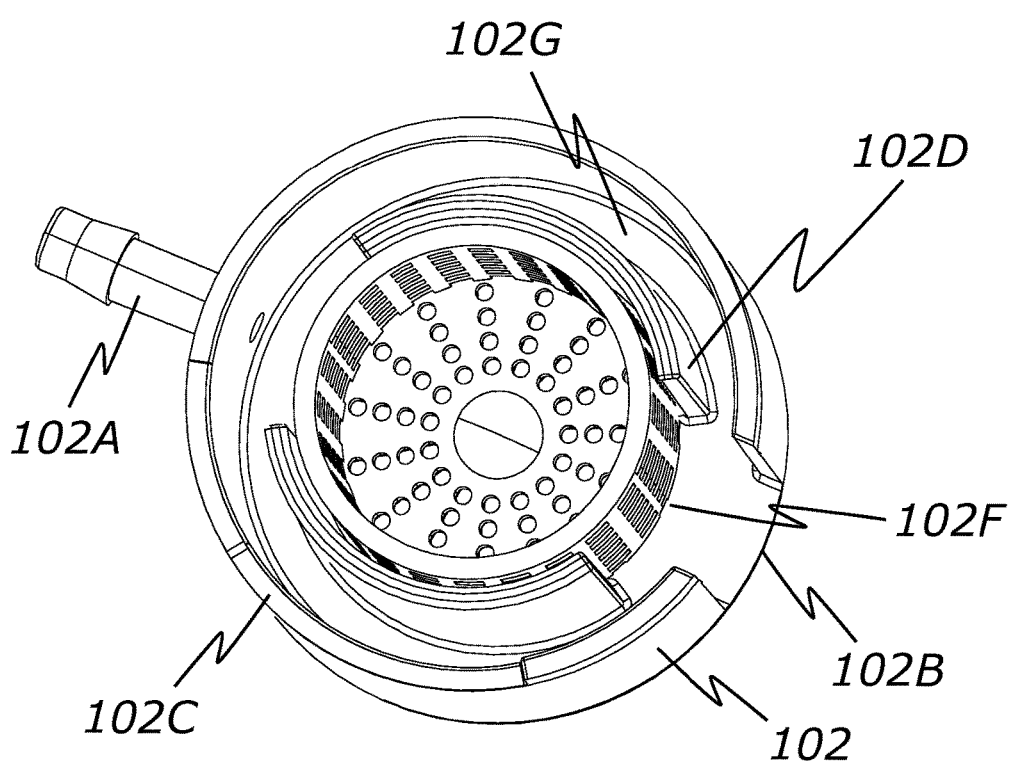
FIG. 8 is a top view of the plant fertilizer device of FIG. 1 without a cap.
Figure 9:
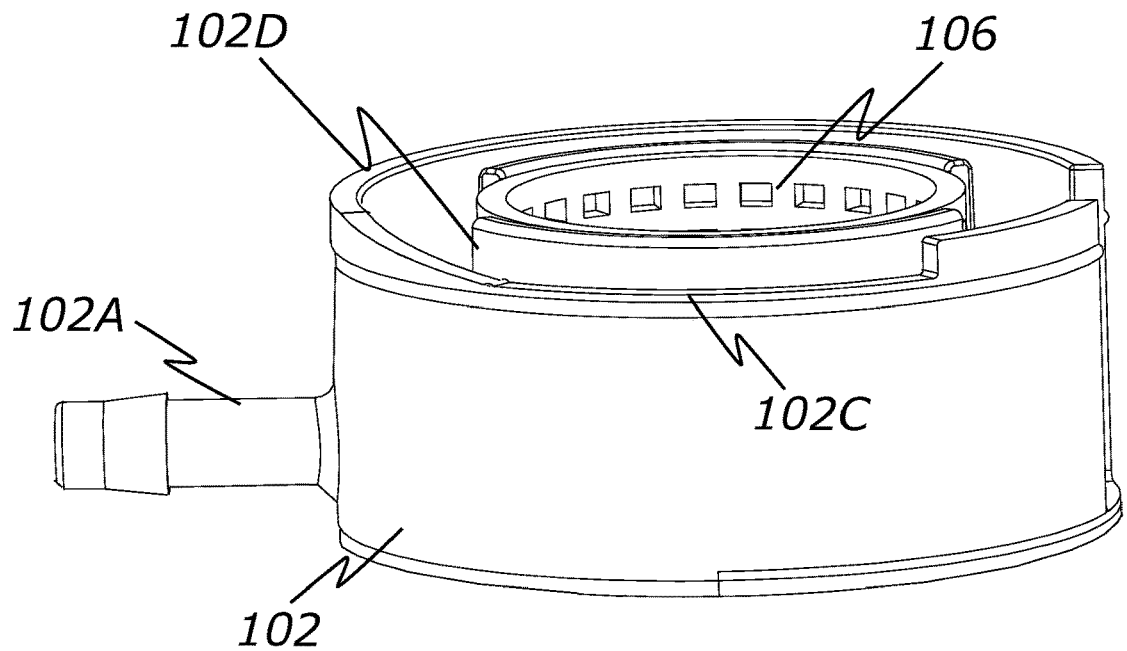
FIG. 9 is a side perspective view of the plant fertilizer device of FIG. 1 without a cap.
Figure 10:
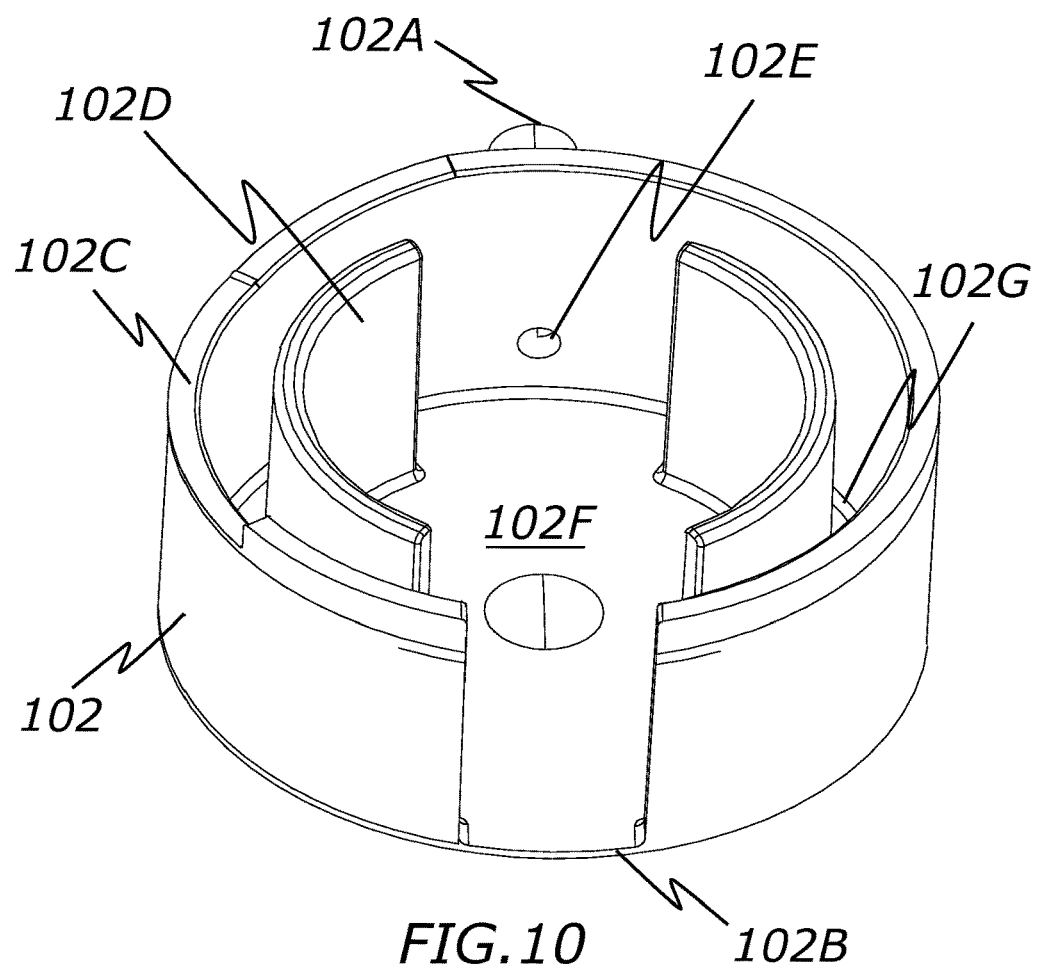
FIG. 10 is a side perspective view of a lower body member of the plant fertilizer device of FIG. 1.
Figure 11:
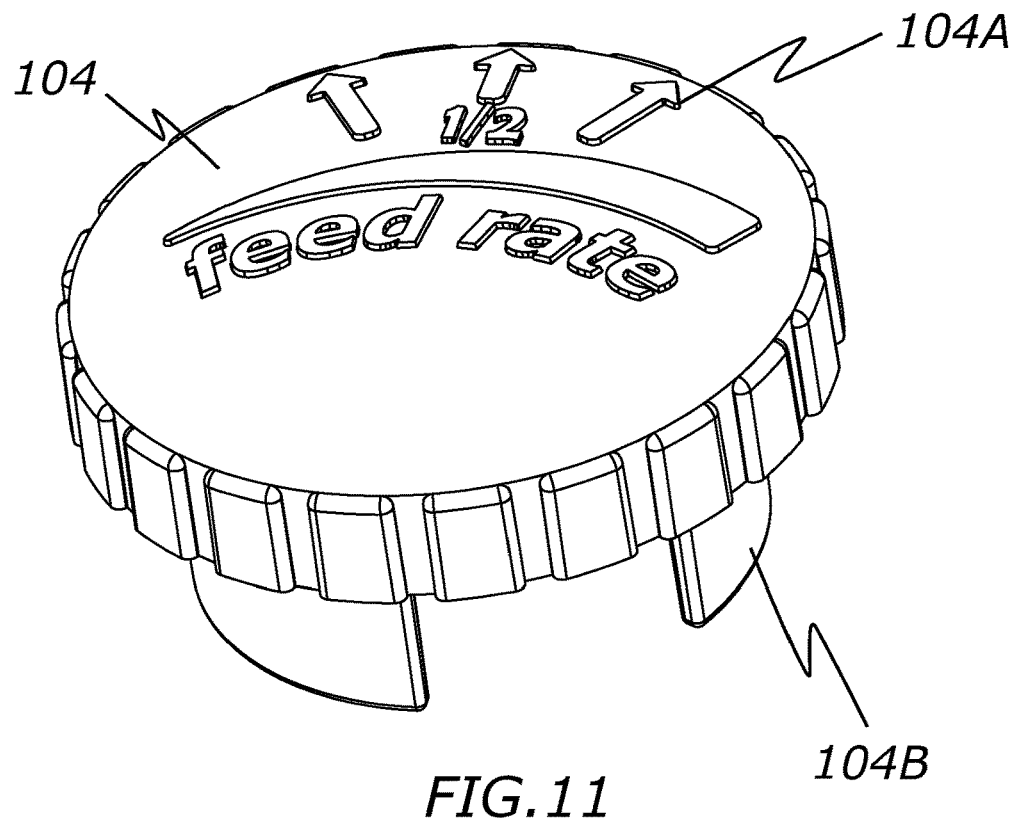
FIG. 11 is a side perspective view of a cap of the plant fertilizer device of FIG. 1.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

While different embodiments may be described in this specification, features of each embodiment can be used interchangeably with other described embodiments. In other words, any of the features of each of the embodiments can be mixed and matched with each other, and embodiments should not necessarily be rigidly interpreted to only include the features shown or described.

Turning first to drip irrigation systems generally, such systems typically provide economical and efficient irrigation by supplying water through a pressurized water supply tube to the irrigated area and releasing drops of the water via drip irrigation emitters that are spaced apart on top or inside along the tube. Example drip irrigation systems can be seen in U.S. Pub. Nos. 20100219265; 20090173811; 20060043219; 20160227716; and U.S. Pat. No. 6,736,337, all of which are incorporated by reference herein. The flow rates typically vary between 1 to 8 liters per hour per drip irrigation emitter and can be used both on and below the ground.

One limitation of drip irrigation, both on-surface and sub-surface, is uniformity of irrigation. Since the drip irrigation emitters are spaced apart, irrigation typically occurs in relatively small spots or bulbs which allows a highly efficient amount of water consumption. However, plants and fertilizer outside of these irrigation areas will not receive water and therefore the drip emitters and slow-release fertilizer pellets/tablets must be carefully placed in proximity to the plants intended to be irrigated.

The present invention is generally directed to an improved device for distributing plant fertilizer. In one embodiment, the device is configured to connect to a drip irrigation system and direct relatively small amounts of water past fertilizer within an interior chamber of a housing of the device. The fertilizer-containing water is then released from the device and into the soil surrounding the plant. In this respect, the user can have a greater confidence that any water released and absorbed by the plant contains fertilizer, despite using a drip irrigation system that may not saturate nearby soil to the extent of other irrigation techniques.

While the present invention is primarily intended to be used with slow-release fertilizer, other types of fertilizer can also be used. Since embodiments of the present invention include an adjustment mechanism to adjust water contact with fertilizer, faster-dissolving fertilizers may also be used.

The device may also include two flow paths through a chamber within its housing. A first flow path circumvents or travels around a fertilizer holding area while a second flow path passes through the fertilizer holding area. In this respect, the second flow path can be adjusted or even completely closed off while the first flow path allows the water to otherwise travel through the device. In other words, irrigation may occur with the device without regard for how much fertilizer is being delivered or exposed within the chamber of the housing.

One embodiment of a plant fertilizing device 100 can be seen in FIGS. 1-4 and includes at least one connection sized and shaped to connect to a drip irrigation system so as to be in communication with an interior waterflow pathway within the drip irrigation system. The device 100 allows water from a drip emitter tube to enter a chamber within the device 100, contact either a slow-release fertilizer tablet or pellets, and then exit the device into nearby soil. Additionally, the device 100 includes an adjustment mechanism that allows a user to increase or decrease the amount of water that contacts the slow-release fertilizer, thereby adjusting the concentration of the fertilizer in the water released from the device 100.

In one embodiment, the device 100 includes a lower body member 102 having a water inlet tube 102A that allows water to enter an interior of the device 100 and a water outlet 102B that allows water to be released from the interior of the device 100. The inlet tube 102A is preferably sized and shaped for connection to a drip irrigation tube. For example, the inlet tube 102A can have a diameter such that it can be pushed into an end of a drip irrigation tube or into a connector for a drip irrigation tube. The inlet tube 102A can be shaped so that it is retained within the drip irrigation tube or connector, such as by having a conical surface that expands in diameter away from the free end of the tube 102A and then abruptly decreases in diameter, so as to form a barb shape.

In one example, the inlet tube 102A is connected directly to a drip irrigation secondary tube, which is then connected to a drip emitter that is then directly connected to the main drip irrigation tube. However, the inlet 102A or other passage within the device 100 itself may include a drip emitter integrated into it and that configured for direct connection to a main drip irrigation tube. Typically, an emitter or drip emitter includes one or more passage through a housing with one or more features that limit the amount and/or rate of water through. Emitters may include a pressure compensating mechanism that reacts to pressure to maintain a roughly constant outlet flow. For example, a rubber diaphragm in which the higher the pressure the more the rubber deforms to restrict the flow.

The water outlet 102B can be located on an opposite end of the device 100 relative to the inlet 102A (or optionally at other locations, such as at about 90 degrees relative to the inlet 102A) so that any water contained in the device 100 can be released. The outlet 102B is depicted as an opening along only a side wall of the lower body member 102, particularly near the bottom floor of the body member 102 so that relatively small amounts of water can escape. However, multiple wall openings and/or openings directly through the floor of the body member 102 are also possible.

As best seen in FIGS. 5-10, the device 100 is preferably arranged to have at least one water path through the fertilizer holding area 102F and one or more water paths 102G around or avoiding the fertilizer holding area 102F. Hence, even if water flow to the fertilizer holding area 102F is closed by the user, water without fertilizer will still pass out of the outlet 102B, allowing a plant to receive water. In one example, the fertilizer holding area 102F is located at about the center or middle of the lower body member 102 (though other positions, such as off-center locations are also possible). The holding area 102F is partially surrounded by inner walls 102D that extend upward from the floor of the lower body member 102, thereby separating the holding area 102F from the water path 102G surrounding each side of the holding areas 102F.

In one embodiment, the inner walls 102D form an opening directly in front of an opening 102E of the inlet tube 102A and an opening directly across from the outlet 102B (i.e., the openings are diametrically opposed to each other). This creates a flow path for water directly through the device 100 and directly through the holding area 102F. Alternate configurations of the openings are also possible. For example, only one opening might be present (e.g., opposite the outlet 102B). Or each of the relatively larger openings may instead by formed by a plurality of smaller openings.

Figure 15:
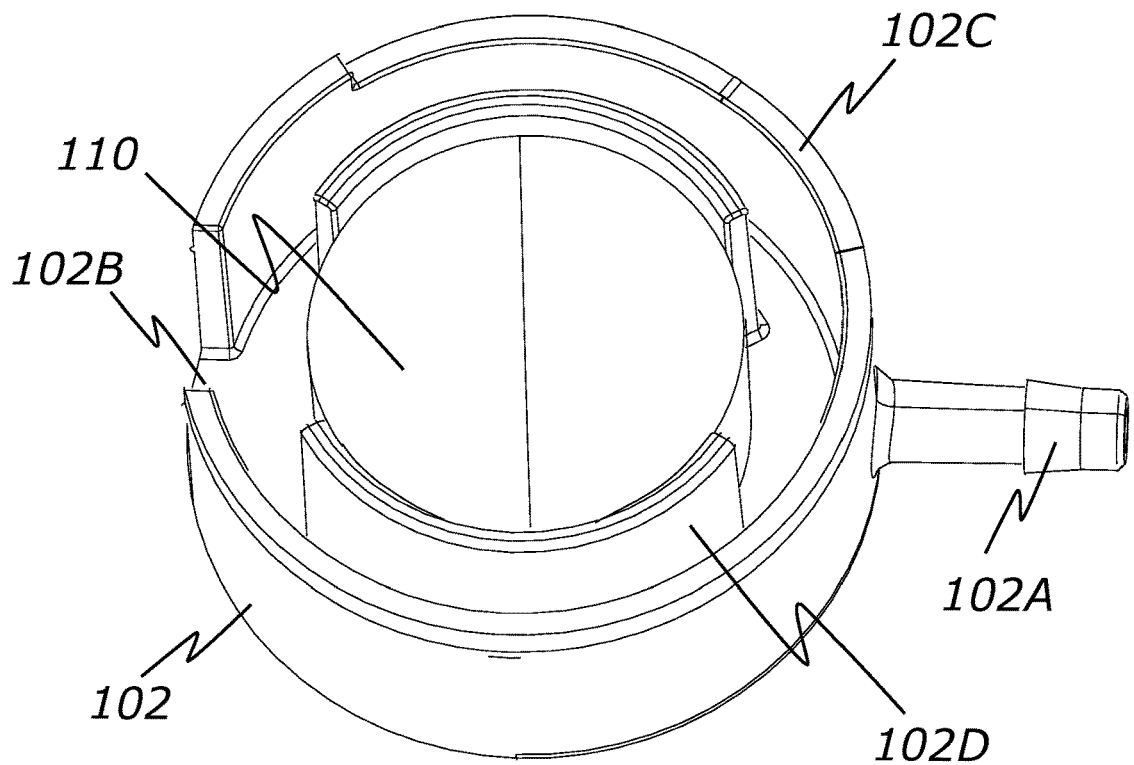
FIG. 15 is a top view of a lower body member of the plant fertilizer device of FIG. 1.
Figure 16:
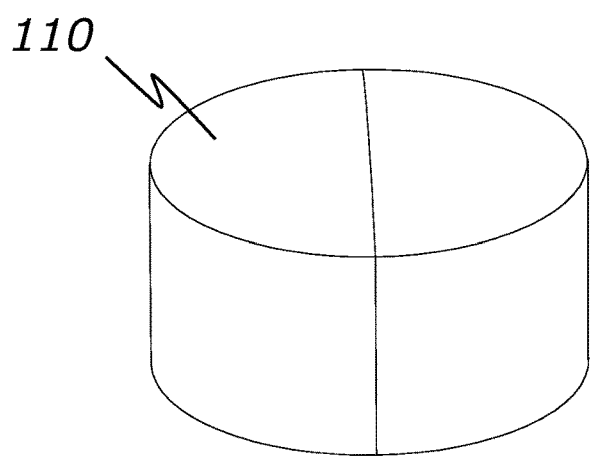
FIG. 16 is a perspective view of a plant fertilizer pellet.

The holding area 102F can be sized to accommodate a slow-release fertilizer tablet 110, as seen in FIGS. 15 and 16. For example, a fertilizer tablet 110 may have a diameter of about 1 inches and a height of about 0.7 inch, and therefore the holding area 102F can be sized slightly larger than these dimensions. Additionally or alternatively, the device 100 may include a removable basket 106 (FIGS. 5-9, 13 and 14) that is configured to contain a plurality of slow-release fertilizer pellets. The basket 106 can be sized to securely fit within the inner walls 102D and includes a plurality of apertures to allow water to pass through. When a tablet 110 is intended to be used, the basket 106 can be removed.

A rotatable cap 104, seen best in FIGS. 5, 6, 11, and 12, is sized and shaped to fit over a top opening of the lower body member 102 and to rotate to adjust how much water reaches the holding area 102F and how much water enters water path 102G and bypasses the holding area 102F. In one embodiment, this adjustment is achieved via upper cap walls 104B that extend from a bottom surface of the cap 104 and are positioned to rotate in front of and away from the openings of the inner walls 102D. In that respect, depending on the position of the upper cap walls 104B, they can partially or fully close off the holding area 102F from water, depending on the rotational orientation of the cap 104 relative to the lower body member 102.

In the present example, upper cap walls 104B of the cap 104 form two openings that are oppositely aligned such that they can each be aligned with the openings of the inner walls 102D. However, other configurations are possible. For example, the relatively larger openings of the upper cap walls 104B can instead be formed from a plurality of smaller openings. Alternatively, there may be no openings and the cap 104 is configured to raise and lower to create a lower gap against the bottom surface of the lower body member 102.

The upper cap walls 104B are preferably sized and positioned such that they are in close proximity to and rotate around the inner walls 102D, but without completely blocking water path 102G. Hence, the upper cap walls 104B, in a closed position, can substantially block all water from entering the holding area 102F while instead allowing incoming water to be redirected through the path 102G and out the outlet 102B so as to bypass the fertilizer in the holding area 102F.

In one embodiment, the top of the cap 104 can include indicia or symbols (e.g., arrows) that correspond to the position of the upper cap walls 104B relative to the inner walls 102D (i.e., the extent that the holding area 102F is open). For example, the indicia may indicate the openings to the holding area 102F are fully open, fully closed, half open, and/or various levels in between. Hence, the user can better understand how much water is being exposed to the fertilizer and therefore have a general idea of how concentrated the fertilizer will be in the outgoing water.

Optionally, the device 100 may include a feature causing the cap 104 to encounter a rotational "stop" in at least one direction of rotation (i.e., the cap 104 is prevented from further rotation in that direction). In one example, this stop can provide the user with a better tactile feel that further communicates when the holding area 102F is in a closed position and also prevents the user from over-rotating past the closed position.

Figure 12:
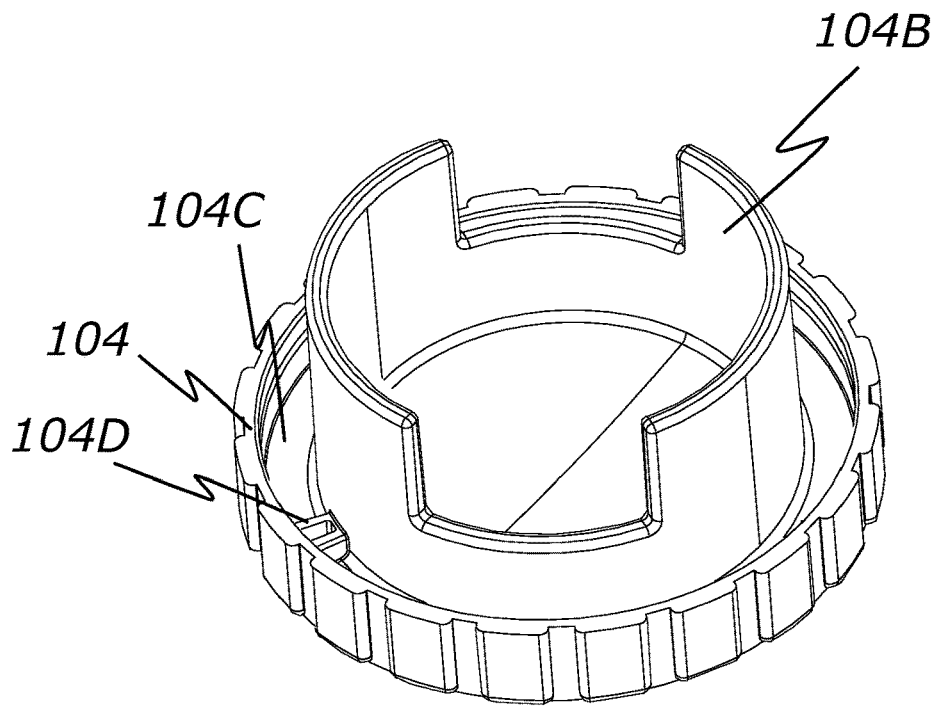
FIG. 12 is a bottom view of a cap of the plant fertilizer device of FIG. 1.
Figure 13:
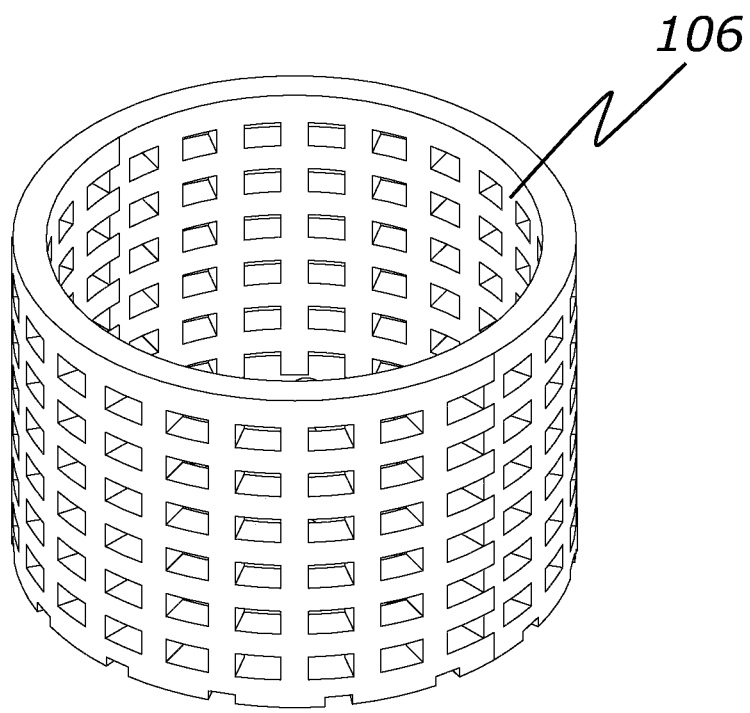
FIG. 13 is a side perspective view of a basket of the plant fertilizer device of FIG. 1.
Figure 14:
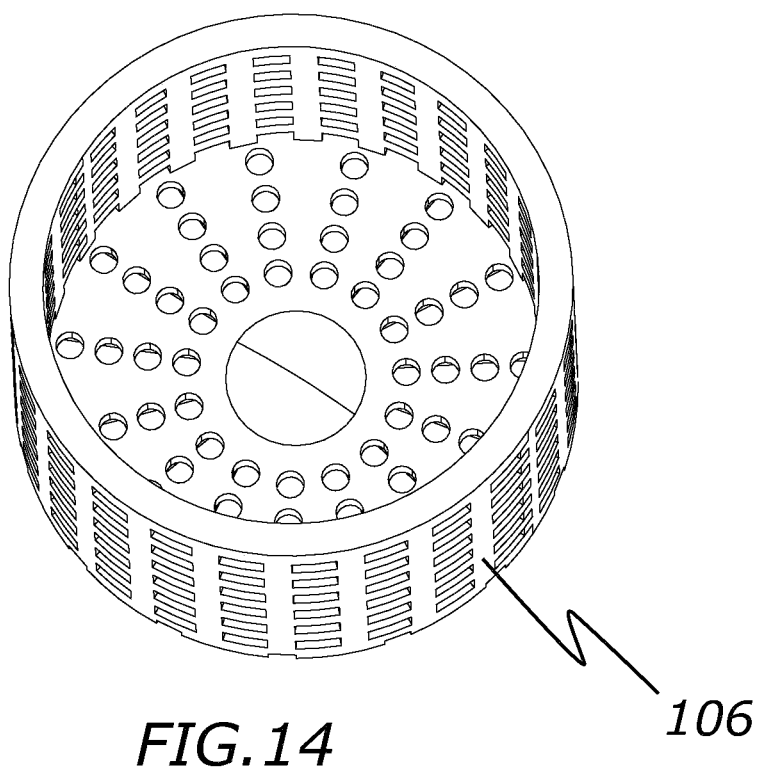
FIG. 14 is a top view of a basket of the plant fertilizer device of FIG. 1.

In one example seen best in FIGS. 7-10, the rotational stop is created by a region 102C of the upper edge having a lower height relative to the remaining portions of the edge. The region 102C can have an abrupt, perpendicular surface at either one or both ends. As seen in FIG. 12, the cap 104 may include a stop member 104D that moves towards and contacts the perpendicular end of the region 102C, causing both the stop member 104D and the cap 104 to stop rotation relative to the lower body member 102.

In one embodiment, only one end has a perpendicular end surface. However, in another embodiment, both ends can have such a perpendicular surface, creating two "stops" for the user. Hence, the rotation of the cap 104 can be configured to stop only in a closed position or can be configured to stop in both a closed and fully open position.

If only one perpendicular end is used, the opposite end of the region 102C can include a ramped surface, as seen in FIGS. 7-10. The ramped surface can be positioned such that when the user rotates the cap 104 beyond the fully open position of the device 100, the stop member 104D follows the ramp and raises or helps separate the cap 104 from the lower body member 102. Since the device 100 is intended to be used in and around dirt, this dirt can move or wedge between the cap 104 and lower body member 102, making the removal of the cap 104 difficult in some circumstances. The ramped surface allows the user to overcome any additional friction from the dirt by rotating beyond the fully open position of the device 100.

In one example, the lower body member 102 has a diameter of about 1.650 inches. In another example, the lower body member has a height of about 0.750 inch. In another example, the holding areas 102F has a diameter of about 1 inch and a height of about 0.560 inch. In another example, the water path 102G has a width of about 0.150 inch. In another example, the outlet 102B has a width of about 0.5 inch. In another example, the inlet opening 102E has a diameter of about 0.1 inch and is positioned about 0.250 inch above the bottom surface of the lower body member 102.

At least the lower body member 102 should be considered a housing for the purposes of this specification. The cap 104 may or may not be considered to be part of the housing. While two flow paths are described, such as through the fertilizer holding area 102F and around the fertilizer holding area 102F, these flow paths may or may not be considered to overlap with each other. In other words, these two flow paths do not necessarily need to be completely distinct from each other and may optional be considered to overlap at different portions.

While the cap 104 is described as being part of the adjustment mechanism that adjusts the water flow to the fertilizer holding area 102F, it is possible to have other mechanism that may move the upper cap walls 104B or similar walls disconnected from the cap 104. For example, a similar wall may instead have an arm that extends through a slot in the lower body portion 102, allowing a user to move the arm and therefore the position of the inner wall. In another example, one or more of these inner walls may be removably mounted within the chamber of the lower body portion 102, allowing a user to remove the cap 104 and add or remove individual wall segments to selectively open or block access to the fertilizer holding area 102F. In another example, the cap 104 may be configured to move vertically and therefore also move the attached the upper cap walls 104B vertically to open and close access to the fertilizer holding area 102F. In that respect, the cap 104 and lower body portion 102 may also have vertical position locking features that allow the vertical position of the cap 104 to be locked in place or release when rotated.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A fertilizer device for an irrigation system, comprising:
a housing having an inner chamber, a water inlet in communication with the inner chamber, and a water outlet in communication with the inner chamber; wherein the housing forms a first water path through a fertilizer holding area within the inner chamber and a second water path around the fertilizer holding area; and,
an adjustment mechanism comprising one or more members having at least a first position closing off the first water path and a second position opening the first water path, wherein the second water path extends around a first side of the fertilizer holding area and around a second side of the fertilizer holding area.

2. The fertilizer device of claim 1, wherein the fertilizer holding area comprises one or more holding area walls forming a first side opening and a second side opening.

3. The fertilizer device of claim 2, wherein the first side opening and the second side opening are aligned with the water inlet and the water outlet.

4. The fertilizer device of claim 2, wherein the adjustment mechanism further comprises a cap in which the one or more members extend into the inner chamber such that rotation of the cap moves the one or more members between the first position closing off the first water path and the second position opening the first water path.

5. The fertilizer device of claim 4, wherein a lower surface of the cap includes a stop member; and wherein in at least one rotational position of the cap, the stop member contacts a first region of the housing that prevents further rotational movement of the cap.

6. The fertilizer device of claim 1, wherein the water inlet is shaped for connection to a drip irrigation system.

7. The fertilizer device of claim 1, wherein the housing further comprising a drip emitter.

8. The fertilizer device of claim 1, further comprising a removable basket sized and shaped to fit within the fertilizer holding area.

9. The fertilizer device of claim 1, wherein the water outlet further comprises a plurality of apertures in the housing.

10. A fertilizer device for an irrigation system, comprising:
a lower body portion having one or more outer walls forming an inner chamber, and one or more inner walls spaced apart from the one or more outer walls and forming an inner fertilizer holding area within the inner chamber; the one or more outer walls forming a water inlet and a water outlet; the one or more inner walls forming a first opening and a second opening; wherein the one or more outer walls and the one or more inner walls form a first water path around the inner fertilizer holding area; and,
at least one fertilizer adjustment wall having a first position blocking the first opening of the one or more inner walls, and at least a second position leaving open the first opening of the one or more inner walls, wherein the at least one fertilizer adjustment wall includes a first fertilizer adjustment wall and a second fertilizer adjustment wall; and when in the first position, the first fertilizer adjustment wall blocks the first opening of the one or more inner walls and the second fertilizer adjustment wall blocks the second opening of the one or more inner walls.

11. The fertilizer device of claim 10, further comprising a cap sized and shaped to engage with a top of the lower body portion; the cap being connected to the at least one fertilizer adjustment wall.

12. The fertilizer device of claim 11, wherein the at least one fertilizer adjustment wall extends from a lower surface of the cap.

13. The fertilizer device of claim 12, wherein the cap further comprises a stop member positioned to limit its rotational position relative to the lower body portion.

14. The fertilizer device of claim 13, wherein an upper surface of the lower body portion comprises a ramped surface positioned to vertically raise the cap relative to the lower body portion when the cap is rotated.

15. The fertilizer device of claim 14, wherein the fertilizer device further comprises a drip emitter.

16. The fertilizer device of claim 14, further comprising a plurality of indicia on a top surface of the cap.

17. The fertilizer device of claim 14, further comprising a basket sized and shaped to be removable positioned within the inner fertilizer holding area.

18. A fertilizer device for an irrigation system, comprising:
a housing means having a first water flow path through a fertilizer holding area means and a second water flow path around the fertilizer holding area means; and,
an adjustment means comprising one or more members having at least a first position closing off the first water flow path and a second position opening the first water flow path, wherein a cap includes the one or more members and seals the first water flow path and the second water flow path by engaging with a top of the housing means such that fluid may enter or exit the housing means only through a water inlet or a water outlet of the housing means.

* * * * *